Jan. 1, 1924 1,479,595
C. FIELD
APPARATUS FOR CONVEYING AND DISTRIBUTING ICE
Filed April 7, 1920 2 Sheets-Sheet 1

Jan. 1, 1924 1,479,595
C. FIELD
APPARATUS FOR CONVEYING AND DISTRIBUTING ICE
Filed April 7, 1920 2 Sheets-Sheet 2

Inventor
Crosby Field,
By Attorney
C. P. Goefel.

Patented Jan. 1, 1924.

1,479,595

UNITED STATES PATENT OFFICE.

CROSBY FIELD, OF YONKERS, NEW YORK, ASSIGNOR TO CHEMICAL MACHINERY CORPORATION, OF NEW YORK, N. Y., A CORPORATION OF NEW YORK.

APPARATUS FOR CONVEYING AND DISTRIBUTING ICE.

Application filed April 7, 1920. Serial No. 372,047.

*To all whom it may concern:*

Be it known that I, CROSBY FIELD, a citizen of the United States, and resident of the city of Yonkers and State of New York, have invented certain new and useful Improvements in Apparatus for Conveying and Distributing Ice, of which the following is a description.

This invention relates to an improved apparatus for conveying and distributing ice. The methods heretofore in vogue, of cracking and distributing ice for use in chemical processes, refrigeration and analogous purposes are generally wasteful, laborious and expensive. It is, therefore, the primary purpose and object of the present invention to provide an apparatus for this purpose whereby the ice in cracked form, may be delivered to one or more of a plurality of utilization points or stations, practically without manual labor, and with a minimum of waste.

In one embodiment of the invention I propose to maintain a continuous flow of water under pressure, through a closed circulating system, and discharge the ice in small particles into the rapidly moving body of water. At spaced points in the system the flow of water and ice may be diverted or shunted off at the will of the operator, and by suitable automatic means the ice is separated from the water and conveyed to the desired point without interrupting the continuous flow of the water.

It is another object of my invention to provide a very simple and reliable apparatus which may be constructed at comparatively small cost, whereby the improved method of ice distribution may be successfully practiced.

In addition, it is the purpose of the present improvements to provide an apparatus which may be easily adapted for the conveyance and distribution of various other materials which are specifically lighter than water.

With the above and other objects in view, the invention consists in the improved apparatus and the construction and relative arrangement of the several parts thereof, as will be subsequently described in detail and finally incorporated in the subjoined claims.

In the accompanying drawings wherein I have illustrated one practical and satisfactory embodiment of the apparatus, and in which similar reference characters designate corresponding parts, throughout the several views.

Figure 1:
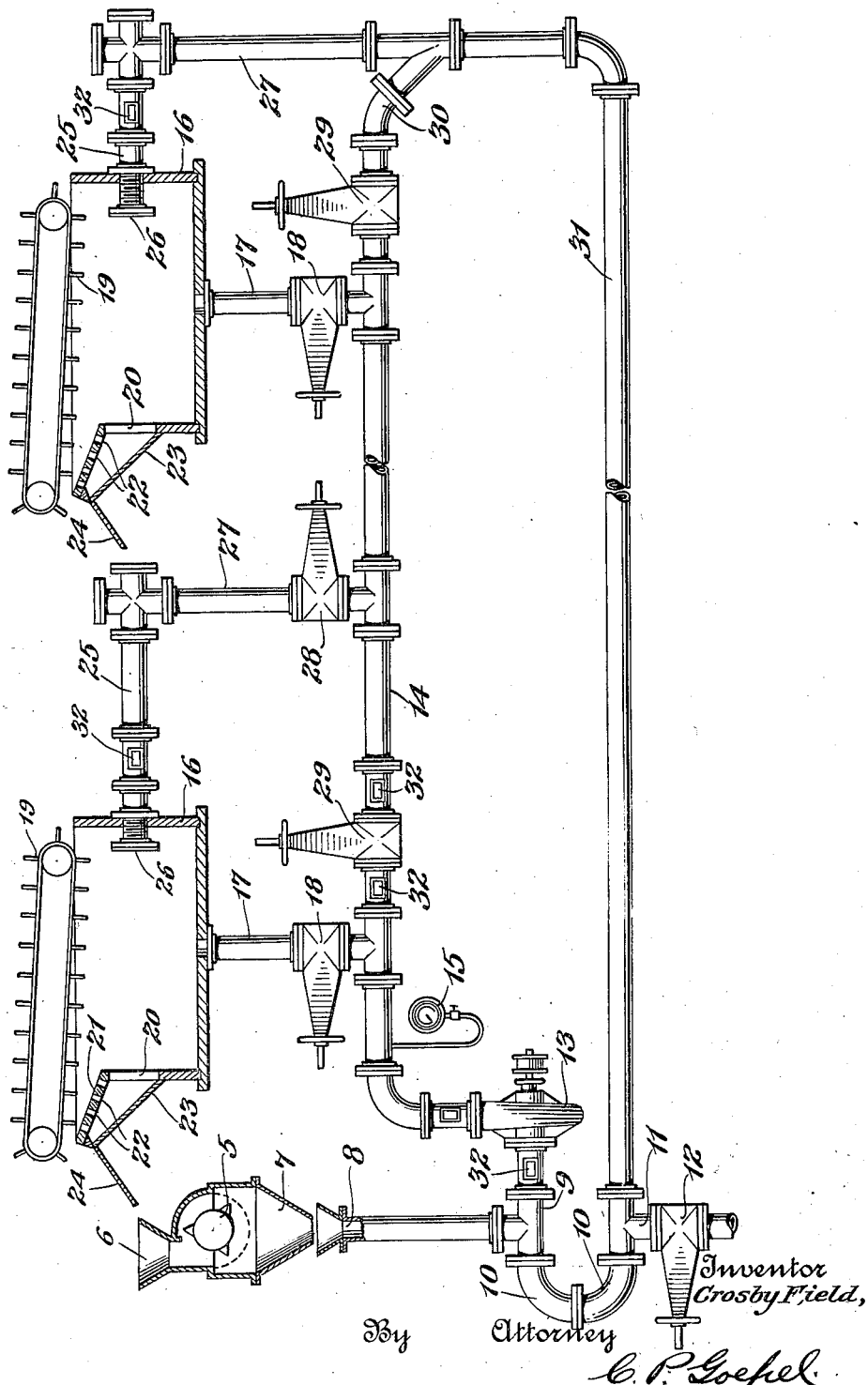
Figure 1 is an elevation, partly in section, illustrating a preferred form of the apparatus.

Considering the drawings in detail, 5 designates an ice crusher or cracker, to which the ice is fed through the hopper 6. This ice-cracking device may be of any approved construction, and after the ice has been cracked or broken up into relatively small particles, it is delivered by the outlet spout 7 into the upper end of a vertically disposed pipe 8, through which the cracked ice falls by gravity into the pipe connection 9. This pipe connection 9 is, in turn, connected by means of the elbow joint members 10 to the water supply pipe 11, in which a quick opening valve 12 is interposed. The pipe 9 delivers cracked ice and water to a centrifugal pump 13, which forces the water and ice upwardly into the distributing pipe 14. To this pipe a suitable pressure gauge 15 is connected, whereby the water pressure may be readily ascertained, and clogging of the ice in the pipe avoided. With this construction the cracked ice is delivered by the pipe 8 into the water crculating system at the rear of the pump 13, so that both the ice and water pass through the pump and are subjected to direct pressure from it.

In the water-circulating system a plurality of ice separators are arranged. As these separators are preferably all of like construction, the following description of one will suffice for all.

Above the distributing pipe 14 a receptacle 16 is arranged, and is connected by the pipe 17 to the distributing pipe 14, a valve 18 being arranged in said connecting pipe. The receptacle 16 may be of any desired dimensions in accordance with the required capacity of the apparatus, and is open at its upper side. A flight conveyor 19 is mounted above the receptacle, and is disposed at a longitudinal inclination, as shown, so that one end of the lower stretch of the conveyor extends within the receptacle.

The opposite end wall of the receptacle 16 is provided with an opening 20, and a laterally projecting, upwardly inclined wall 21 at the upper end of this opening. This wall is provided with a plurality of spaced openings 22, therein, through which the water is adapted to drain upon a plate 23, whereby it is directed downwardly and returned to the receptacle. At the upper end of this wall a chute or other suitable means, indicated at 24, is positioned to receive the cracked ice and convey the same to the point of utilization.

A water-conducting pipe 25 extends through the other end wall of the receptacle 16, and a screen 26, of suitable mesh, is disposed over the open end of this pipe. A vertical pipe 27 connects the pipe 25 at its other end to the distributing pipe 14, and returns the water to the latter pipe. In the pipe 27 a valve 28 is arranged, and a similar valve 29 is also interposed in the distributing pipe 14 between the pipe 17 and 28.

Preferably the valves 18, 28 and 29 are of the quick opening type, and in practice will also preferably be mechanically interconnected by means of links or other means well known in the art, so that in the closing of the valve 29, the valves 18 and 28 will be simultaneously opened.

The distributing pipe 14, at its end, is connected by the joint member 30, of long radius, to an extension of the pipe 27, which receives the water from the last of the separating tanks in the series, such extension being, in turn, connected to the return pipe 31, which is coupled to the upper end of the water supply pipe 11.

At various points in the water and ice-conducting pipes, sight glasses 32 are arranged, so that the condition of the materials flowing therethrough may be readily observed. It will, of course, be understood that it is not necessary to provide a valve 28 in the end pipe 27, which is connected to the last of the ice separators in the series, as this pipe remains always open for the return of the water to the pipe 31.

In the operation of the apparatus as above described the valve 12 is first opened and water admitted to the system until the pipes 14 and 31, and the connections therebetween, are completely filled, and the requisite pressure is registered by the gauge 15. It is understood that at this time the valves 29 are open, while the valves 18 and 28 are closed. This water is maintained in continuous circulation through the pipes by means of the pump 13.

Large cakes or chunks of ice are then fed to the crusher 5, and the ice is broken up into particles of relatively small size, which fall by gravity through the pipe 8 and enter the circulating body of water. The water and cracked ice is driven by the pump 13 through the distributing pipe 14, and as long as the valves 18 and 28 remain closed, the ice and water will be returned through the pipe 31, to the pump.

As is well known, immense quantities of ice are used in various chemical processes, and in plants of extensive size these various processes are carried on at points or locations which are frequently at great distances from each other. It is in such instances that my improved apparatus subserves its most important purpose, as it will be seen from the foregoing disclosure that by closing any one of the valves 29, and opening the adjacent valves 18 and 28, the water and ice may be diverted through the pipe 17 to one of the separators. This water and ice collects within the receptacle 16, and, of course, the cracked ice floats upon the surface of the water. The cubic capacity of the water-circulating pipe system is sufficiently great to insure a complete filling of the tank, so that the accumulating ice is finally brought into contact with the lower stretch of the conveyor 19. The conveyor flights carry off the surface ice longitudinally of the receptacle and move it upon and over the wall 21, the water draining back through the openings 22 and the opening 20 into the receptacle. The cracked ice is finally discharged upon the directing plate or chute 24, or other equivalent means, by which the ice is directed or conveyed to the particular point of utilization. Thus it will be seen that through the medium of my improved apparatus for the distribution of ice, the cracked ice may be very quickly conveyed and distributed in the desired quantities to any number of widely separated locations. Of course, after the system has been completely filled with water, the valve 12 is closed. From time to time this valve may be opened to replenish the water supply, and compensate for such losses as may occur through evaporation or other causes.

From the foregoing description considered in connection with the accompanying drawings, the construction of the illustrated embodiment of the apparatus, will be fully understood.

Figure 2:
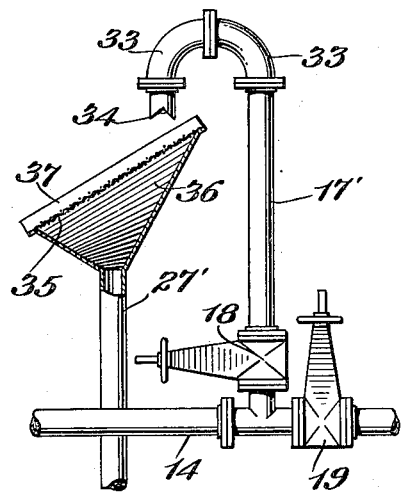
Figure 2 is a fragmentary elevation, partly in section, showing a slightly different embodiment of the ice separating means, and, Figure 3 is an enlarged fragmentary sectional view through one of the ice and water-receiving receptacles and the water conducting pipe connected therewith.
Figure 3:
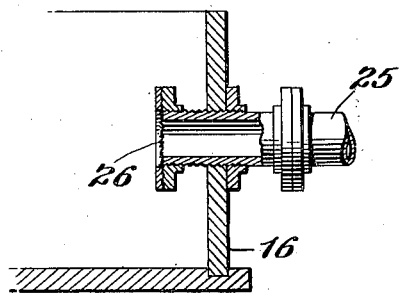

In Figure 2 of the drawings, I have disclosed an alternative form of ice separating means, in which the receptacle 16 is dispensed with and the upper end of the pipe 17' is provided with connected joint members 33 which, together, form a substantially semi-circular bend, open at its end, as at 34, said open end discharging the water and ice upon an inclined screen 35, which extends over the upper open end of a receiving hopper 36, provided upon the upper end of the water return pipe 27'. This hopper is provided with longitudinal side flanges 37 for the purpose of guiding the ice in its downward gravity movement into a conveying chute or other suitable receiving means.

I have referred to the invention as being designed and intended for the conveyance and distribution of ice, but it is, nevertheless, to be considered as within the contemplation of my present improvements to adapt the invention for the purpose of conveying and distributing paper, wood or fiber products, as well as numerous other materials which are specifically lighter than water. Such adaptations in analogous industrial fields may be readily made by resorting to such minor variations in the construction and assemblage of the several parts of the apparatus as will readily suggest themselves to those skilled in the particular art, in order to successfully meet the exigencies which may arise in each particular case. It is accordingly to be understood that while the foregoing description and the accompanying drawings exemplify certain approved and satisfactory practical embodiments of the invention, the apparatus is susceptible of embodiment in various other alternative concepts, and I, therefore, reserve the privilege of adopting all such changes as may be fairly embodied within the spirit and scope of the invention as claimed.

I claim:

1. In a conveying apparatus, a plurality of spaced collecting receptacles, distributing and return conduits connected for the continuous circulation of a material conveying liquid therethrough, a pump for maintaining such circulation under pressure, means for feeding the material into the circulating fluid at the intake side of said pump, supply and return pipes connecting each of the collecting receptacles to said distributing conduit, and means associated with each of said receptacles to discharge the material collecting therein without interrupting the continuous circulation of the fluid.

2. In an ice conveying and distributing apparatus, means for maintaining a continuous flow of water under pressure in a closed circulating system, means for delivering cracked ice into the circulating body of water, a plurality of spaced ice separators connected to the water circulating system, each separator including a water and ice collecting receptacle, and a water return pipe connecting the receptacle in the system, means arranged at the upper open side of the receptacle to remove the floating ice, means for draining water from the ice and returning the water to the receptacle, and valves interposed in the circulating system for selectively controlling the flow of water and ice to said separators.

In testimony that I claim the foregoing as my invention, I have signed my name hereunder.

CROSBY FIELD.